April 28, 1931.   W. H. SCHULZE   1,803,136
SEPARABLE SHAFT AND GEAR
Original Filed Dec. 31, 1924    2 Sheets-Sheet 1
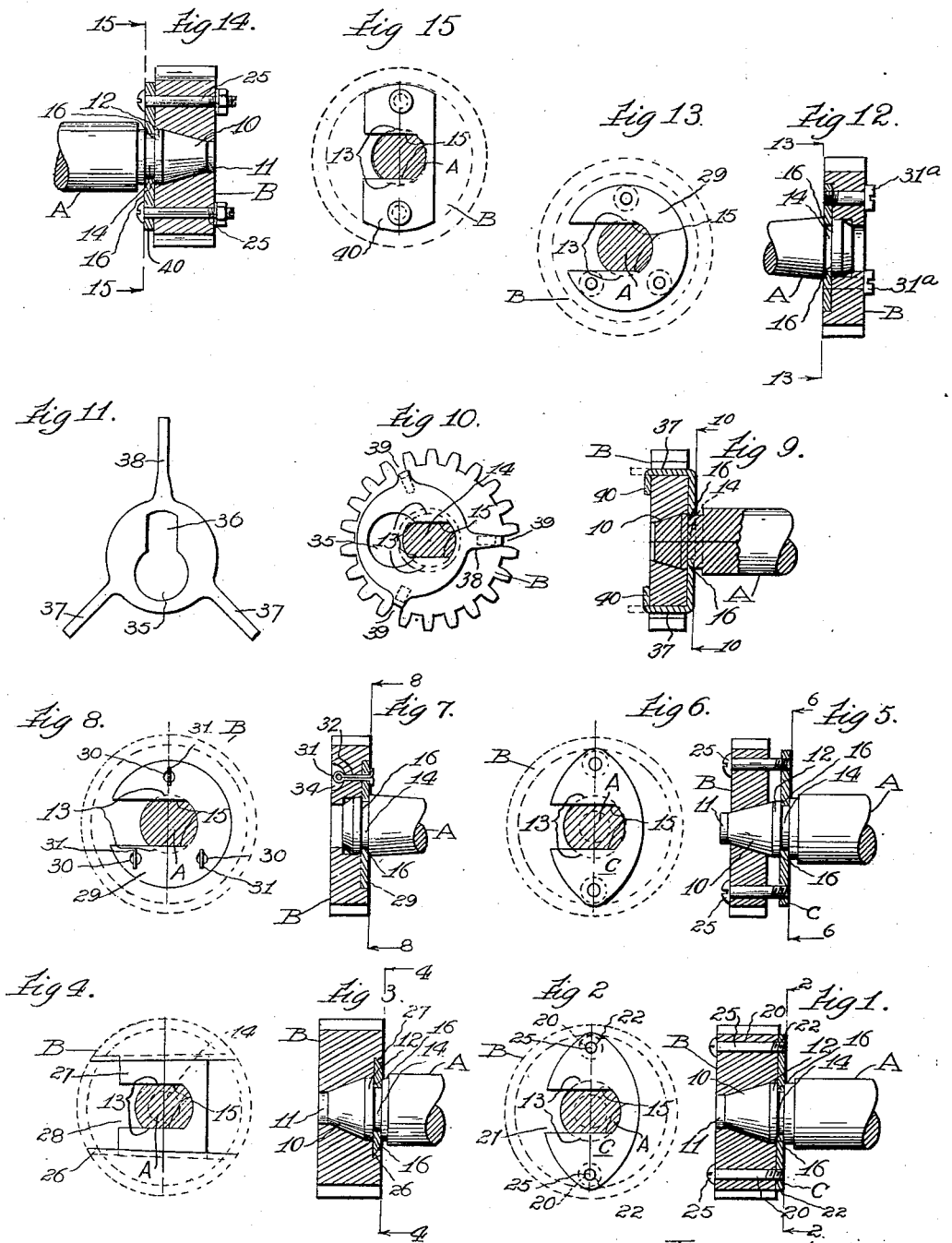

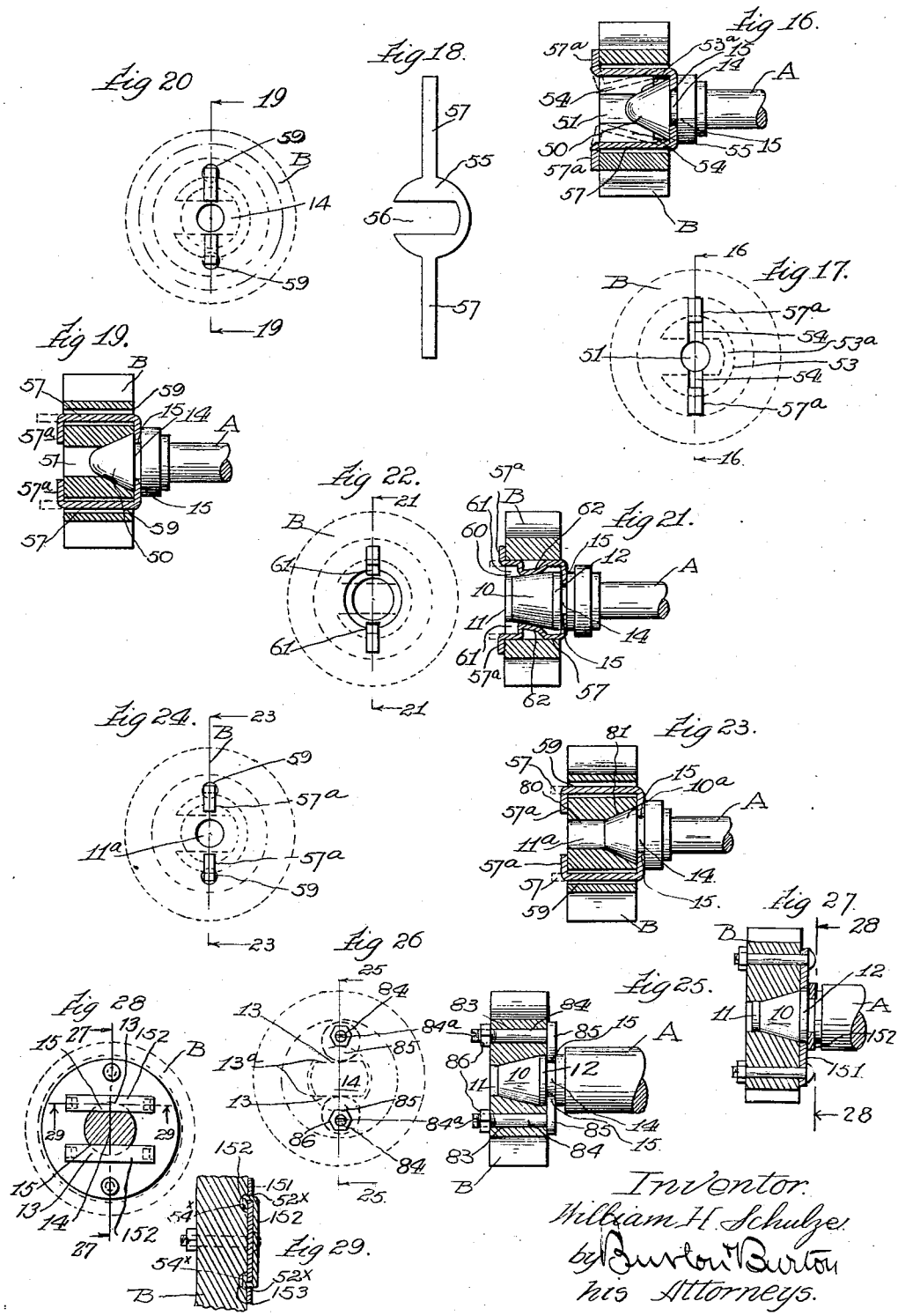

Patented Apr. 28, 1931

1,803,136

UNITED STATES PATENT OFFICE

WILLIAM H. SCHULZE, OF CHICAGO, ILLINOIS, ASSIGNOR TO STEWART-WARNER CORPORATION, OF CHICAGO, ILLINOIS, A CORPORATION OF VIRGINIA

SEPARABLE SHAFT AND GEAR

Application filed December 31, 1924, Serial No. 759,024. Renewed May 17, 1926.

The purpose of this invention is to provide an improved construction of a shaft and a disengageable gear with attaching means affording secure mounting of the gear on the shaft as against relative displacement either rotatively or axially. It consists in the elements and features of construction shown and described as indicated in the claims.

In the drawings:

Figure 1 is an axial section of a shaft and gear embodying this invention.

Figure 2 is a section at the line 2—2 on Figure 1.

Figure 3 is a view similar to Figure 1 showing another form of the invention.

Figure 4 is a section at the line 4—4 on Figure 3.

Figure 5 is a view similar to Figure 1 showing a third form of the invention.

Figure 6 is a section at the line 6—6 on Figure 5.

Figure 7 is a view similar to Figure 1 showing a fourth form of the invention.

Figure 8 is a section at the line 8—8 on Figure 7.

Figure 9 is a view similar to Figure 1 showing a fifth form of the invention.

Figure 10 is a section at the line 10—10 on Figure 9.

Figure 11 is a plan view of the blank from which the gear attaching device for the forms shown in Figures 9 and 10 is produced by folding the arms as hereinafter explained.

Figure 12 is a view similar to Figure 1 showing a sixth form of the invention.

Figure 13 is a section at the line 13—13 on Figure 12.

Figure 14 is a view similar to Figure 1 showing a seventh form of the invention.

Figure 15 is a section at the line 15—15 on Figure 14.

Figure 16 is a view similar to Figure 1 being a section at the line 16—16 on Figure 17 showing an eighth form of the invention.

Figure 17 is a front elevation showing a face view of the gear of the form shown in Figure 16.

Figure 18 is a plan view of the blank from which the attaching device for the forms shown in Figures 16 and 17 is made by folding.

Figure 19 is a section similar to Figure 1 showing a ninth form of the invention as in section at the line 19—19 on Figure 20.

Figure 20 is a face view or front elevation of the construction shown in Figure 19.

Figure 21 is a view similar to Figure 1 being a section at the line 21—21 on Figure 22 showing a tenth form of the invention.

Figure 22 is a face view or front elevation of the form shown in Figure 21.

Figure 23 is a view similar to Figure 1 being a section at the line 23—23 on Figure 24 showing an eleventh form of the invention.

Figure 24 is a face view or front elevation of the form shown in Figure 23.

Figure 25 is a view similar to Figure 1 being a section at the line 25—25 on Figure 26 showing a twelfth form of the invention.

Figure 26 is a face view or front elevation of the form shown in Figure 25.

Figure 27 is a view similar to Figure 1, being section at the line 27—27 on Figure 28 showing a thirteenth form of the invention.

Figure 28 is a section at the line 28—28 on Figure 27.

Figure 29 is a detail section at the line 29—29 on Figure 28.

A specific purpose of this invention is to provide a secure mounting of the gear on a shaft with which it is to be rigid in operation both as against relative rotation and against actual dsplacement, the construction being designed to permit the easy removal of the gear for substitution of another gear by way of repair or for meshing with a different driving or driven gear. For the purpose stated, the invention is characterized by certain expedients for rendering the gear rigid with the shaft which may be employed singly or conjointly and which are embodied both singly and conjointly, in the several forms and modifications of the invention shown in the different figures of the drawing. One of these securing expedients consists in providing a shaft with two longitudinal portions of reduced cross section separated by an unreduced or larger portion, and clamping the latter portion between the gear at the outer side and an attaching device at the inner side of the unreduced portion of the shaft. A second expedient which may be employed separately or conjointly with the first, consists in providing the shaft with a cross-sectionally reduced non-circular part back of the gear-seating part, and providing an attaching device engageable with the shaft at this cross-sectionally reduced part against displacement rotatively or axially, and engageable also with the gear against relative displacement rotatively or axially.

Referring to the drawings in all the forms shown the shaft is indicated by reference letter A and the gear in its totality by the reference letter B. The shaft is shown identically in all the forms and modifications, though certain of its features are functionless in some of the forms; but the purpose being to have the shaft adapted to receive gears of a variety of forms and secured by a variety of means, the features which are functionless in some of the forms are not inconsistent with their proper functioning in the other forms. The shaft is characterized by a reduced terminal portion for seating the gear, which, preferably, and not necessarily for proper functioning, in certain of the forms comprises a tapered portion, 10, back of a short terminal cylindrical portion, 11, and forward of a short cylindrical portion of the larger diameter, 12. Back of the entire terminal comprising the parts 10, 11 and 12, the shaft is reduced in cross section by parallel cross slots at opposite sides indicated at 13, 13, reducing the shaft at this part to a neck, 14, oblong in cross section and affording by its opposite parallel flats, 15, 15, shoulders of the nature of key seats for engaging against rotation the gear attaching devices of the various forms shown in the different figures. These cross slots also form rearwardly facing shoulders, 16, 16, against which the attaching device may be stressed in clamping the gear onto the porton of the shaft formed between the two cross-sectional reductions, viz., that by which the tapered portion, 10, is formed and that by which the neck, 14, is produced. This portion of the shaft is referred to as unreduced portion by way of distinction from or contrast with the two reductions mentioned, notwithstanding the shaft may, at some portion in its length beyond the mounting of the gear thereon, be larger than this portion.

In the forms shown in Figures 1 and 2 the gear, B, has a central aperture for seating it on the centering terminal of the shaft corresponding in form to the reduction and taper of said centering terminal as may be clearly understood from Figure 1. At two points at opposite sides of the center the gear has holes, 20, 20, extending through it parallel with the axis. The attaching device in this form consists of a plate, C, having a notch, 21, extending in from one side making it fork-shaped and adapted to fit upon the cross-sectional oblong neck, 14, of the shaft, and when thus engaged with the shaft to register holes, 22, 22, with which the plate is provided, with the holes, 20, 20, in the gear. Stems of some nature, and shown in the drawings as bolts, 25, are inserted through the registered holes in the gear and attaching plate, the holes in the attaching plate being threaded for screwing the bolts thereinto and thereby clamping the gear onto the unreduced or enlarged portion, 10, of the shaft or otherwise stated, clamping the larger or unreduced portion of the shaft between the gear and the attaching plate. These bolts, 25, referred to as "stems" of the attaching plate are properly considered as an element of the plate, since obviously, they might be extended rigidly from the plate and even be integral therewith as in certain other forms shown, the securement for clamping being by some means at the end protruding from the face of the gear. A construction within this general form description appears in certain of the modifications, and I do not limit myself to having these stems in the form of bolts as shown in Figures 1 and 2.

In the forms shown in Figures 3 and 4 the gear having its central aperture fitted to the shaft as in Figures 1 and 2 has at the back side a dove-tail groove, 26, extending across from side to side, over an area including the entire shaft aperture of the gear at that side, this slot being slightly tapered narrowing from one side of the gear to the other as may be seen in Figure 4; and the attaching device consists of a plate, 27, tapered and beveled to correspond to the dove-tail groove, and having a notch, 28, extending in from the narrower end rendering it fork shaped for engaging the cross sectional oblong neck, 14, of the shaft and the opposite slots 13 of the shaft by which this neck is formed. It will be understood that in this form the gear being entered upon the centering terminal of the shaft to an easy seating position, the attaching plate or key as it may be properly termed, 27, is entered in the dove-tail grooves, 26, of the gear and in the opposite parallel slots, 13, of the shaft; and being forced home, that is, into tightly wedged engagement in the dove-tail groove, it is also in driving engagement by the fork with the shaft; and the parts being dimensioned with reasonable accuracy the gear is clamped onto the tapered centering and terminal of the shaft so as to be held both by the engagement of the plate against either rotative or axial displacement, and also by frictional engagement of the tapered terminal of the shaft with a tapered portion of the gear aperture.

In the form shown in Figures 5 and 6 the construction is substantially the same as illustrated in Figures 1 and 2 as to the form of the gear and attaching plate, except that the gear is shown narrower or thinner than the axial extent of the tapered portion, 10, of the shaft, so that the screwing in of the bolts for tying the gear to the plate, C, forces the gear onto the tapered shaft terminal more tightly that it might be forced in the form shown in Figure 2 by the time the attaching plate in that form became drawn flat up against the back side of the gear. That is to say, in this form, Figures 5 and 6, the frictional engagement of the gear with the shaft may be relied upon for holding the gear to a greater extent than in the form shown in Figures 1 and 2, although in both forms the engagement of the plate with the shaft against both rotative and axial displacement and the engagement of the plate with the gear against relative displacement rotatively or axially is the same.

The form shown in Figures 7 and 8 is especially designed for a relatively thin gear which permits only a relatively short centering terminal of the shaft for seating the gear and consequently permits less reliance upon the clamping of the larger portion of the shaft between the gear and the attaching plate and compels chief reliance upon the other expedient for holding the gear rigid with the shaft, namely, the engagement of the attaching plate with the shaft against relative displacement rotatively or axially and its engagement with the gear also against relative displacement rotatively or axially. The attaching plate in this form is a circular plate, 29, notched to give it the fork form for engaging the neck and rearwardly facing shoulder of the shaft, and seated in a circular recess in the back of the gear to assist in centering the gear. It has three holes, 30, for cotter pins, 31, or the like, registering with corresponding holes, 32, in the gear for receiving cotter pins which are inserted through the registered holes with their heads accommodated in recesses, 34, and their ends clinched on the outer face of the gear.

In the form shown in Figures 9, 10 and 11 the securing plate shown in blank in Figure 11 from which it is formed has a round aperture, 35, suitably diametered to permit the plate to pass over the tapered centering terminal of the shaft, a notch, 36, opening from its central aperture being dimensioned for engaging the neck, 14, of the shaft and rendering the plate substantially forked for such engagement. The point at which the axis of the shaft passes through the plate when it is engaged thus with the neck, 14, constitutes the center from which radiate three attaching arms, 37, 37 and 38, which are folded at right angles to the plane of the plate for receiving the gear which has three correspondingly situated apertures, 39, 39, 39, through which these attaching arms enter and extend when the gear is advanced onto the shaft after the plate has been applied as described and engaged with the neck. When thus entered to full seating position on the centering terminal of the shaft the ends of the arms, 37, 37 and 38, are clinched down over the outer face of the gear as seen at 40 and thereby the gear is held securely both centered and positioned in the proper direct transverse plane with respect to the shaft.

In the form shown in Figures 12 and 13 the construction is substantially the same as that of Figures 7 and 8, the difference being merely that the attaching plate, 29, is bound to the gear by the bolts, 31ª, instead of by cotter pins, 31.

In the form shown in Figures 14 and 15 the attaching plate, 40, is secured by bolts passing through the plate and the gear as in the form of Figures 12 and 13, but whereas in Figures 12 and 13 like Figures 7 and 8, the gear has a circular recess in its rear side in which the attaching plate is lodged and fitted assisted in centering the gear, in the form of Figures 14 and 15 the attaching plate, 40, is applied upon the back side of the gear without any such recess and is therefore not circular in outline, and is secured by two bolts only.

In the forms shown in Figures 16, 17 and 18 the shaft, A, has a conical terminal, 50, considerably shorter than the thickness of the gear. The gear has a relatively small central bore, 51, extending through it and counterbored at the rear side as indicated by the dotted circle, 53, on Figure 17 to the full diameter of the base of the conical terminal, 50, of the shaft, and from the counterbore, 53, it is conically counterbored to form a tapered seat at 53ª for the conical terminal, 50, of the shaft. The gear is milled to form two directly opposite radially extending rectangular grooves, 54, leading from the central bore, 51, deeper by the amount of the thickness of the attaching device, 55, then the counterbore 53. The attaching device, 55, is shown in blank in Figure 18 comprising a central circular portion having a diametric notch, 56, adapted to stride and engage the neck, 14, and transverse notches, 13, of the shaft, and has oppositely projecting arms, 57, 57, which are folded at right angles to the circular portion rendering the device U-shaped when it is applied to the shaft by its forked central portion striding the neck, 14, and engaging the opposite slots 13 of the shaft, and in this form the spacing of the arms, 57, corresponds to the depth of the slots, 54, so that in applying the gear to the shaft said arms, 57, extend in the slots, 54, and engage the gear against relative rotation of the gear and attaching device and the ends of the arms, 57, projecting beyond the face of the gear may then be clinched down outwardly on the face of the gear forming clinch hook as seen at 57$^a$. By reason of the extension of the radial slots, 54, to the central bore, 51, the gear may be disengaged from the shaft by springing the arms, 57, of the attaching device inwardly as shown in the dotted lines in Figure 16 disengaging the clinch hook ends, 57$^a$, from the face of the gear. And it will be seen that the construction renders it possible to apply and engage the gear in the first instance by folding the ends of the attaching device outwardly to form the clinch hooks, 57$^a$, before applying the gear, the arms, 56, being sprung inwardly to the position shown in dotted line in Figure 16 for admitting the gear over the hook ends, 57, the entire device, 55, being made of spring metal whereby the arms, 57, are adapted to spring out into engagement of their hood ends over the face of the gear when the gear has been passed back into position seating the tapered counterbore 53$^a$, on the tapered terminal, 50, of the shaft.

In the forms shown in Figures 19 and 20 the construction is identical with that of Figures 16, 17 and 18, except that instead of the slots or grooves, 54, extending radially from the central counterbore of the gear, the gear has two diametrically opposite transverse holes, 59, bored through it, through which the arms, 57, of the attaching device extend when the gear is applied, and the ends of these arms are then clinched over inwardly upon the face of the gear, instead of outwardly as in the form shown in Figures 17 and 18. The purpose of this differentiation from the form shown in Figures 16, 17 and 18 is to obtain the means of engagement by the clinch hook ends over the face of the gear when the depth of the gear and teeth leaves insufficient available area on the face of the gear inside the teeth for the hook engagement.

In the forms shown in Figures 21 and 22 the shaft is of the form in all respects shown in Figures 1 and 3, that is, having the tapered portion, 10, and the larger and smaller cylindrical portions, 11 and 12. The gear in this form has a single central cylindrical bore, 60, substantially of the diameter of the larger cylindrical portion, 12, of the shaft; and it is milled to form diametrically opposite slots or notches, 61, 61, leading from this central bore. The attaching device is formed from a blank identical with that shown in Figure 18 and engaged with the shaft in the same manner as described with respect to the forms shown in Figure 16, 17 and 18; but in the form of Figures 21 and 22 the arms, 57, of the attaching device are shaped by bending as seen in Figure 21 so as to have convergingly sloping portions, 62, 62, projecting from the slots or grooves, 61, into the cylindrical bore, 60, for seating the tapered portion, 10, of the shaft. It will be understood that the attaching device in this form,—but with the ends extending as shown in dotted line in Figure 21, that is, not clinched over,—is applied to the shaft, and the gear is then introduced over the shaft terminal and the said attaching device to the position shown in Figure 21, whereupon the ends of the arms, 57, are clinched over forming hook ends, 57$^a$, engaged over the forward face of the gear.

In the forms shown in Figures 23 and 24 the shaft has a gear centering terminal comprising a tapered portion, 10$^a$, and a cylindrical terminal portion, 11$^a$, of considerable length as compared with the cylindrical portion, 11, of the shaft shown in Figures 1 and 3. The gear in this form is bored to form a central cylindrical seat, 80, for fitting the terminal, 11$^a$, of the shaft, and counterbored forming a tapered seat, 81, fitting the conical portion, 10$^a$, of the shaft. The attaching device in this form is identical with that shown in Figure 19 and the gear has round holes, 59, 59, as in the form shown in Figure 19 for receiving the U arms of the attaching device which has its hook ends, 57$^a$, clinched over upon the face of the gear as in the form shown in Figure 19.

In the form shown in Figures 25 and 26 the shaft is of the form shown in Figures 1 and 2. The gear is bored and counter-bored to fit and seat upon the shaft terminal, and has parallel holes, 83, 83, at diametrically opposite positions for receiving the stems, 84, 84, of the two-part attaching device or the two attaching devices shown and which consist each of said stems, 84, and a head, 85, slightly eccentric in form, the opposite end of the stem being threaded to receive the nuts, 86. The eccentricity of the head, 85, is sufficient so that the rotation of the device in the hole in which the stem is engaged with the shaft enters the head, 85, in the transverse slot, 13, of the shaft and causes it to cam snugly against the flat, 13$^a$, or key seat of the shaft. The method of assembling this form is that the attaching devices, 84, 85, are applied to the gear by the insertion of their stems through the holes of the gear and the nuts are applied but not drawn tight. The attaching devices are then turned in the gear so that the heads 85 are separated sufficiently to admit the shaft between them as the gear is applied upon the shaft terminal. The operation of turning the nuts for tightening them on the stems will rotate the attaching devices to thrust the eccentric heads into the notches 13, of the shaft and as the nuts are tightened for clamping these attaching devices to the gear, the eccentric heads are simultaneously clamped against the key seats of the shaft, but for greater certainty of causing them to be thus clamped the threaded ends of the bolts are also preferably slotted as seen at 84$^a$ for screw driver engagement to turn and hold the stems as described independently of the tightening of the ends.

In the form shown in Figures 27, 28 and 29, there is provided a plate, 151, bolted to the back side of the gear and centrally apertured to pass over the larger cylindrical portion, 12, of the gear terminal; this plate constituting part of the means for attaching the gear to the shaft; said attaching means comprise in addition to the plate a pair of bars, 152, 152, constituting key members which are adapted to fit in and engage the cross slots, 13, 13, of the shaft and extend over the back of the plate, 151, to which they are secured each at both ends by being provided with clinching terminals, 153, 153, bent to project through co-operating apertures, 52×, 52×, in the plate, these terminals being clinched down on the forward side of the plate and being accommodated in the slight recess, 54×, 54×, formed for that purpose in the back side of the gear. It will be recognized that the two key members being held rigidly in relation to each other by their attachment to the plate serve for engagement of the plate and thereby of the gear with the shaft against relative displacement either rotatively or axially.

I claim:—

1. In combination a shaft and a disengageable gear, the shaft having a circular tapered gear-centering terminal and reduced in cross-section for a limited axial distance back of said terminal, the gear having a central aperture and thereby adapted to be centered on the shaft, and a gear-attaching key device having a transaxially extending portion engaged with the shaft at said cross-sectional reduced part of the latter for stopping said key device longitudinally of the shaft, and means by which said key device is at the same time engaged with the shaft for rotation, said key device having also two parallel limbs extending through the gear at opposite sides of the gear-centering terminal, the gear and said transaxial limbs of the device being adapted for engagement positively both as against relative rotation and as against relative axial displacement.

2. In the construction defined in claim 1, the shaft reduction back of the gear seat being by slots in a transaxial plane at opposite sides of the axis, and a key device comprising a notched part having its notch striding the neck of the shaft which is formed by said opposite slots, the body of said key device extending in said transaxial plane and lapping the back side of the gear to the points of engagement of said device therewith.

3. In combination a shaft and a disengageable gear, the shaft having a circular tapered gear-centering terminal and parallel transaxial slots back of said terminal, the gear having a central aperture and thereby adapted to be centered on the shaft and a gear-attaching key device having transaxial limbs engaged with the transaxial slots for rotation with the shaft and par-axial limbs extending through the gear at opposite sides of the gear-centering terminal, the gear and said par-axial limbs of the device being adapted for engagement positively both as against relative rotation and as against relative axial displacement.

4. In combination a shaft and a disengageably attached gear, the shaft having a circular tapered gear-centering terminal, the shaft being reduced at the inner side of the gear back of said terminal by opposite lateral slots in a transaxial plane, whereby there is formed a shoulder facing away from the gear-centering terminal, the gear having a central opening and thereby adapted for being centered on the centering terminal of the shaft and the attaching device comprising two substantially parallel members and means connecting them rigidly for extending respectively in opposite cross slots of the shaft embracing the neck of the shaft, said connecting means lapping the back side of the gear for securement of the attaching device thereto.

5. In the construction defined in claim 1, foregoing, the shaft reduction at the inner side of the gear seat being by opposite lateral slots in a transaxial plane, and the attaching device being in fork form striding the neck of the shaft formed by said opposite slotting, the body of the fork extending in said transaxial plane and lapping the back side of the gear to the points of securement thereto.

6. In the construction defined in claim 1, foregoing, the shaft reduction at the inner side of the gear seat being by opposite lateral slots in a transaxial plane and the attaching device being in fork form striding the neck of the shaft formed by said opposite slotting, the body of the fork extending in said transaxial plane and lapping the back side of the gear to the points of securement thereto, the gear having apertures in the general direction of the axis and the securing means being extended from said lapping body of the fork through said apertures.

7. In combination a shaft and gear adapted for disengageable rigid engagement, the shaft being terminally reduced to form a circular tapered gear-centering terminal and having parallel slots in transaxial plane at opposite sides and back of the gear-centering terminal and a gear-securing key member forked for engagement of its fork-limbs in the cross slots of the shaft and having gear engaging limbs projecting from the fork-limbs respectively in the general direction of the axis of the shaft and gear, the gear having a central aperture for engagement by the terminal of the shaft and par-axial apertures positioned for receiving the par-axial limbs of the key member, said par-axial limbs being adapted to be clinched down upon the outer face of the gear for holding the gear against longitudinal displacement of the shaft.

8. In the construction defined in claim 4, foregoing, the shaft having a gear-stopping shoulder back of the centering terminal and the cross slots for the gear-engaging limbs of the gear-securing key member being cut back into said shoulder to the depth of the thickness of the key member, whereby the gear may be bound against the shoulder by clinching of said gear-engaging limbs of the key member on the face of the gear.

9. In combination, a shaft and a disengageably attached gear, the shaft having a gear-centering terminal and a portion back of said terminal rendered non-circular for a limited axial distance by two separate cross-sectional reductions each extending transaxially with respect to said terminal at opposite sides of the axis, said reduction forming shoulders facing away from the centering terminal; the gear having a central opening, and thereby being adapted for being centered on the centering terminal of the shaft, and attaching means adapted to be engaged with the gear against relative displacement either axially or rotatively, and adapted also to engage the non-circular part and both said shoulders.

10. In combination a shaft, a gear detachably mounted on the shaft, the shaft having a tapered gear-centering terminal and having back of said terminal at opposite sides of the axis rearwardly facing shoulders and a key seat, the gear having a central aperture diametered for seating on the shaft terminal, and attaching means engageable with the gear against relative rotation and also for simultaneous engagement with both said opposite shoulders and with the key seat of the shaft.

11. In combination a shaft and a gear detachably mounted thereon, the shaft having a circular tapered gear-centering terminal and having two separate cross sectional reductions each extending transaxially with respect to said terminal at opposite sides of the axis back of the seat of the gear to form at said opposite sides rearwardly facing shoulders, the gear having a central aperture for receiving the centering terminal of the shaft, and gear-attaching means adapted to engage the reduced portion of the shaft at both said opposite shoulders, the gear and said attaching means being correspondingly formed for mutual engagement against relative displacement.

12. In combination, a shaft and a gear detachably mounted thereon, the shaft having a circular tapered gear-centering terminal and a key seat, and having two separate cross sectional reductions each extending transaxially with respect to said terminal at opposite sides of the axis back of the seat of the gear to form at said opposite sides rearwardly facing shoulders, the gear having a central aperture for receiving the centering terminal of the shaft and gear, attaching means comprising means engaging the key seat and adapted to engage the reduced portion of the shaft at both said opposite shoulders, the gear and said attaching means being correspondingly formed for mutual engagement against relative rotation.

In testimony whereof, I have hereunto set my hand at Chicago, Illinois, this 26 day of December, 1924.

WILLIAM H. SCHULZE.